(12) United States Patent
Kanke et al.

(10) Patent No.: US 9,207,149 B2
(45) Date of Patent: Dec. 8, 2015

(54) DRIVE-TRAIN TESTING SYSTEM

(71) Applicant: MEIDENSHA CORPORATION, Tokyo (JP)

(72) Inventors: Masayasu Kanke, Tokyo (JP); Takao Akiyama, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 14/371,661

(22) PCT Filed: Dec. 7, 2012

(86) PCT No.: PCT/JP2012/081858
§ 371 (c)(1),
(2) Date: Jul. 10, 2014

(87) PCT Pub. No.: WO2013/105375
PCT Pub. Date: Jul. 18, 2013

(65) Prior Publication Data
US 2015/0013443 A1 Jan. 15, 2015

(30) Foreign Application Priority Data
Jan. 13, 2012 (JP) .................. 2012-005553

(51) Int. Cl.
*G01M 17/007* (2006.01)
*G01M 13/02* (2006.01)

(52) U.S. Cl.
CPC .......... *G01M 17/007* (2013.01); *G01M 13/025* (2013.01)

(58) Field of Classification Search
CPC .......................... G01M 13/025; G01M 17/007
USPC ............... 73/115.01, 115.05, 115.07, 116.05, 73/118.02
See application file for complete search history.

(56) References Cited

U.S. PATENT DOCUMENTS

| 4,680,975 A * | 7/1987 | Dodt ......................... 73/862.09 |
| 5,450,761 A * | 9/1995 | Zilberman et al. ....... 73/862.329 |
| 2001/0054321 A1* | 12/2001 | Kamiyama et al. ...... 73/862.191 |
| 2006/0106526 A1* | 5/2006 | Sugita et al. .................. 701/114 |
| 2007/0240517 A1* | 10/2007 | Kingsbury et al. ............. 73/760 |
| 2014/0360284 A1* | 12/2014 | Nakagawa ............... 73/862.191 |

FOREIGN PATENT DOCUMENTS

| JP | 6-307986 A | 11/1994 |
| JP | 9-70198 A | 3/1997 |
| JP | 11-150977 A | 6/1999 |

(Continued)

*Primary Examiner* — Eric S McCall
(74) *Attorney, Agent, or Firm* — Muncy, Geissler, Olds & Lowe, P.C.

(57) ABSTRACT

The present invention provides a drive-train testing system that is capable of generating a large drive torque without increasing the size of a motor that simulates an engine. The drive-train testing system inputs a drive torque, which is generated according to a torque command which contains an alternating-current component having an excitation frequency, to an input shaft of a workpiece in order to evaluate the performance of said workpiece. This system is equipped with a first motor, a second motor, a torque meter for detecting a torque which acts upon the shaft between the workpiece and the second motor, and a resonance suppression circuit that divides the torque command into a first torque command and a second torque command so as to suppress torsional resonance on the basis of a value detected by the torque meter.

8 Claims, 11 Drawing Sheets

(56) References Cited

FOREIGN PATENT DOCUMENTS

| | | | |
|---|---|---|---|
| JP | 2002-71520 A | 3/2002 |
| JP | 2004-53422 A | 2/2004 |
| JP | 2006-170681 A | 6/2006 |
| JP | 2009-287986 A | 12/2009 |
| JP | 2011-107051 A | 6/2011 |

* cited by examiner

DRIVE-TRAIN TESTING SYSTEM

TECHNICAL FIELD

The present invention relates to a drive-train testing system.

BACKGROUND ART

A drive train is a collective term referring to a plurality of devices for transmitting energy generated in an engine to driving wheels; and the drive train is configured by an engine, a clutch, a transmission, a drive shaft, a propeller shaft, a differential gear, driving wheels, etc. In a performance evaluation test of the drive train, the transmission is actually driven by the engine in a continuous manner, thereby evaluating durability performance, quality, etc. thereof. Recently, as a system for testing such a drive train, it has been proposed that a driving torque to be input into a workpiece is generated by a motor instead of a real engine.

FIG. 7 is a diagram schematically showing a configuration of a drive-train testing system 101. FIG. 7 illustrates an example, of which test piece is a drive train of an FR drive system.

A drive shaft of a motor 103 simulating an engine is connected to an input shaft of a workpiece 102 configuring a part of the drive train. A dynamometer 105 corresponding to a load for absorbing a transmission output of the workpiece 102 is connected to a propeller shaft 104 which is an output shaft of the workpiece 102. The testing system 101 is provided with: a torque meter 106 for detecting a shaft torque acting on the input shaft of the workpiece 102; and a torque meter 107 for detecting a shaft torque acting on the output shaft of the workpiece 102, thereby controlling a driving torque generated by the motor 103, and an absorbing torque generated by the dynamo-meter 105, based on detected values of the meters 106 and 107.

In a real engine, cyclic torque fluctuation is generated due to combustion processes in each cylinder. In the testing system 101 as well, which uses the motor as shown in FIG. 7, it has been proposed that an alternating-current component based on a sine wave is added to a direct-current component for generating a constant driving torque, thereby causing the driving torque generated by the motor to artificially fluctuate, and improving the test reproducibility (for example, see Patent Document 1).

Patent Document 1: Japanese Unexamined Patent Application, Publication No. 2002-71520

DISCLOSURE OF THE INVENTION

Problems to be Solved by the Invention

Incidentally, in recent years, in order to test a wider variety of vehicle types, and to improve the test reproducibility, it is desired to generate a higher driving torque in the testing system as described above. Increasing the diameter of the motor is conceivable in order to satisfy such a desire; however, as described below, increasing the diameter of the motor is difficult due to restriction in layout of a testing system.

FIG. 8 shows the testing system 101 of FIG. 7, of which test piece is changed to a drive train of an FF drive system.

As shown in FIG. 8, in the drive train of the FF drive system, a drive shaft 109 is an output shaft of a workpiece 108, and extends from both sides of the workpiece 108 that is configured by a clutch, a differential gear, a transmission, etc. Therefore, increasing the diameter of the motor 103 is limited when securing the positions for providing the drive shaft 109, dynamometers 110 and 111 connected to both ends of the drive shaft 109, torque meters 112 and 113, etc.

The present invention has been made in view of the above problems; and an object of the present invention is to provide a drive-train testing system, which is capable of generating a high driving torque without increasing a diameter of a motor simulating an engine.

Means for Solving the Problems

In order to achieve the above mentioned object, a first aspect of the present invention provides a drive-train testing system (for example, a testing system 1 to be described later) for evaluating a characteristic of a workpiece (for example, a workpiece W to be described later) by inputting a driving torque, which is generated in accordance with a torque command including an alternating-current component of an excitation frequency, into an input shaft (for example, an input shaft S1 to be described later) of the workpiece configuring a part of a drive train. This testing system is characterized by including: a first motor (for example, a first motor 2a to be described later); a second motor (for example, a second motor 2b to be described later), one end side of a drive shaft thereof being connected to a drive shaft of the first motor, and the other end side of the drive shaft thereof being connected to an input shaft of the workpiece; a shaft torque detection means (for example, a torque meter 6 to be described later) for detecting a torque that acts on a shaft between the workpiece and the second motor; and a resonance suppression circuit (for example, a resonance suppression circuit 5 to be described later) for dividing the torque command into a first torque command for the first motor and a second torque command for the second motor, based on a detected value of the shaft torque detection means, so as to suppress torsion resonance of an axis that connects the first motor, the second motor, and the workpiece.

In the invention according to the fist aspect, drive shafts of two motors, i.e. the first motor and the second motor, are connected with each other. That is to say, the two motors for generating driving torques to be input into the input shaft of the workpiece are serially connected with each other in a so-called tandem configuration, thereby making it possible to generate a high driving torque without increasing the diameter of the individual motors. Therefore, a wider variety of vehicle types can be tested, and the test reproducibility can also be improved.

Incidentally, in the conventional testing system 101 shown in FIG. 7, when the workpiece 102 is considered to be a rigid body characterized by a single moment of inertia, the controlled object in the testing system 101 can be considered to be a two-inertia system characterized by three parameters of: a moment of inertia $J_{MOTOR}$ [kgm$^2$] of the motor 103; a moment of inertia $J_{WORK}$ [kgm$^2$] of the workpiece 102; and a spring constant $K_{tm}$ [Nm/rad] of a torsional elastic axis for connecting the motor 103 and the workpiece 102 (see FIG. 9). With regard to this two-inertia system, it is well-known that a resonant frequency $f_r$ [Hz] expressed by the following equation (1) exists in torsional vibration of an axis between the motor 103 and the workpiece 102.

[Equation 1]

$$f_r = \frac{1}{2\pi}\sqrt{\frac{(J_{WORK} + J_{MOTOR})K_{tm}}{J_{WORK} \cdot J_{MOTOR}}} \qquad (1)$$

The resonant frequency $f_r$ expressed by this equation (1) is sufficiently lower than the frequency (excitation frequency) band of the torque fluctuation generated by a motor simulating a real engine. Therefore, in the conventional testing system 101, even if the torque is caused to fluctuate by an excitation frequency, existence of such torsion resonance has not been manifested as a problem.

However, in the present invention, the first motor and the second motor are configured in tandem, and the controlled object is a three-inertia system instead of the conventional two-inertia system. As a result, the resonant frequency in the torsional vibration of the axis exists between the workpiece and the second motor, as well as between the first motor and the second motor, within or in the vicinity of the excitation frequency band. Therefore, this brings about a new problem of protecting the mechanical system from resonation. In contrast, in the invention according to the first aspect, in consideration of the problem of torsion resonance manifested by configuring the motors in tandem, the resonance suppression circuit is provided for dividing the torque command, which includes the alternating-current component of the excitation frequency, into the first torque command for the first motor and the second torque command for the second motor, so as to suppress the torsion resonance, based on detection of a shaft torque between the workpiece and the second motor. This makes it possible to generate a high driving torque, while protecting the mechanical system from resonance.

In a second aspect, it is preferable that a generalized plant (for example, a generalized plant 7, 7A to be described later) is defined, in which a nominal plant (for example, a nominal plant P to be described later) is a mechanical system model of a three-inertia system having transfer functions characterized by: a moment of inertia (J1) of the first motor; a moment of inertia (J2) of the second motor; a moment of inertia (J3) of the workpiece; a spring constant (K12) of a torsional axis connecting the first motor and the second motor; and a spring constant (K23) of a torsional axis connecting the second motor and the workpiece; in which it is preferable that the resonance suppression circuit is designed by applying a control system design method, which is referred to as an H ∞ control or μ synthesis, to the generalized plant.

The method for designing a controller, which is based on robust control theories such as the H ∞ control or μ synthesis, is a method for designing a controller by selecting a nominal plant as a model for design, and estimating a range of uncertainty, which is a difference between the nominal plant and the actual controlled object, such that robust stability is guaranteed, and a desired control purpose is achieved, with regard to a set of models including fluctuations within this range. According to the second aspect of the invention, the resonance suppression circuit is designed by applying the H ∞ control or μ synthesis to the generalized plant, in which a nominal plant is a mechanical model of a three-inertia system that can generate torsion resonance as described above. As a result, the torque can be appropriately divided into the first motor and the second motor, so as to suppress the torsion resonance between the workpiece and the second motor, as well as between the first motor and the second motor.

In a third aspect, it is preferable that the testing system further includes: a first inverter (for example, a first inverter 3a to be described later) for supplying electric power to the first motor, in accordance with the first torque command calculated by the resonance suppression circuit; and a second inverter (for example, a second inverter 3b to be described later) for supplying electric power to the second motor, in accordance with the second torque command calculated by the resonance suppression circuit; in which it is preferable that the generalized plant includes a control error (w1) of the first inverter, a control error (w2) of the second inverter, and a detected error (w5) of the shaft torque detection means, as disturbances; and it is preferable that the generalized plant includes a result (z1) of weighting a difference between a weighted torque command and a total of the first torque command and the second torque command, and a result (z4) of weighting an output of the transfer functions (Gtm (s)) having a characteristic of the shaft torque detection means, as controlled variables.

According to the third aspect of the invention, in the generalized plant, the difference between the torque command and the total of the first torque command and the second torque command, and the output of the transfer functions having the characteristic of the shaft torque detection means are the controlled variables; and a control error of the first inverter, a control error of the second inverter, and a detected error of the shaft torque detection means are the disturbances. As a result, the influence on the controlled variables of these errors can be suppressed. That is to say, the errors generated in the real system can be suppressed from influencing the torque division and the resonance suppression control.

In a fourth aspect, it is preferable that the generalized plant includes a result (z5) of weighting a shaft torque (K12.T) between the first motor and the second motor, which is output from the nominal plant, as a controlled variable.

According to the fourth aspect of the invention, in the generalized plant, the shaft torque between the second motor and the first motor is the controlled variable, which is allowed to be explicitly evaluated, thereby making it possible to design a resonance suppression circuit with higher resonance suppression effects.

In a fifth aspect, it is preferable that the torque command is defined as a shaft torque command for a shaft torque between the workpiece and the second motor; and it is preferable that the resonance suppression circuit determines the first and second torque commands, such that a detected value of the shaft torque detection means serves as the shaft torque command.

In the fifth aspect of the invention, the first and second torque commands are determined, such that a detected value of the shaft torque detection means serves as the shaft torque command, thereby making it possible to perform the shaft torque control with resonance suppression effects as described in the first aspect of the invention.

In a sixth aspect, it is preferable that a generalized plant (for example, a generalized plant 7B, 7C) is defined, in which a nominal plant (for example, a nominal plant P to be described later) is a mechanical system model of a three-inertia system having transfer functions characterized by: a moment of inertia (J1) of the first motor; a moment of inertia (J2) of the second motor; a moment of inertia (J3) of the workpiece; a spring constant (K12) of a torsional axis connecting the first motor and the second motor; and a spring constant (K23) of a torsional axis connecting the second motor and the workpiece; in which it is preferable that the resonance suppression circuit is designed by applying a control system design method, which is referred to as an H ∞ control or μ synthesis, to the generalized plant.

According to the sixth aspect of the invention, effects equivalent to the effects of the second aspect of the invention are achieved.

In a seventh aspect, it is preferable that the testing system further includes: a first inverter (for example, a first inverter 3a to be described later) for supplying electric power to the first motor, in accordance with the first torque command calculated by the resonance suppression circuit; and a second inverter (for example, a second inverter 3b to be described later) for supplying electric power to the second motor, in accordance with the second torque command calculated by the resonance suppression circuit; in which it is preferable that the generalized plant (7B, 7C) includes a control error (w1) of the first inverter, a control error (w2) of the second inverter, the shaft torque command, and a detected error (w5) of the shaft torque detection means, as disturbances; and it is preferable that the generalized plant includes a deviation (c_in1) between a weighted shaft torque command and a result of weighting an output of the transfer functions having a characteristic of the shaft torque detection means, as an observable to be input into a controller (K').

According to the seventh aspect of the invention, in addition to the effects approximately equivalent to the effects of the third aspect of the invention, it is possible to configure a controller capable of shaft torque control, such that an output value of the shaft torque detection means serves as the shaft torque command.

In an eighth aspect, it is preferable that the generalized plant (7B, 7C) includes a result (z5) of weighting a shaft torque (K12.T) between the first motor and the second motor, which is output from the nominal plant, as a controlled variable.

According to the eighth aspect of the invention, effects equivalent to the effects of the fourth aspect of the invention are achieved.

Effects of the Invention

According to the drive-train testing system of the present invention, two motors are configured in tandem, thereby making it possible to generate a high driving torque, without being restricted by layout. The torque command is divided into the two motors so as to suppress the torsion resonance manifested by the tandem configuration, thereby making it possible to protect the mechanical system from resonance.

EXPLANATION OF REFERENCE NUMERALS

Figure 1:
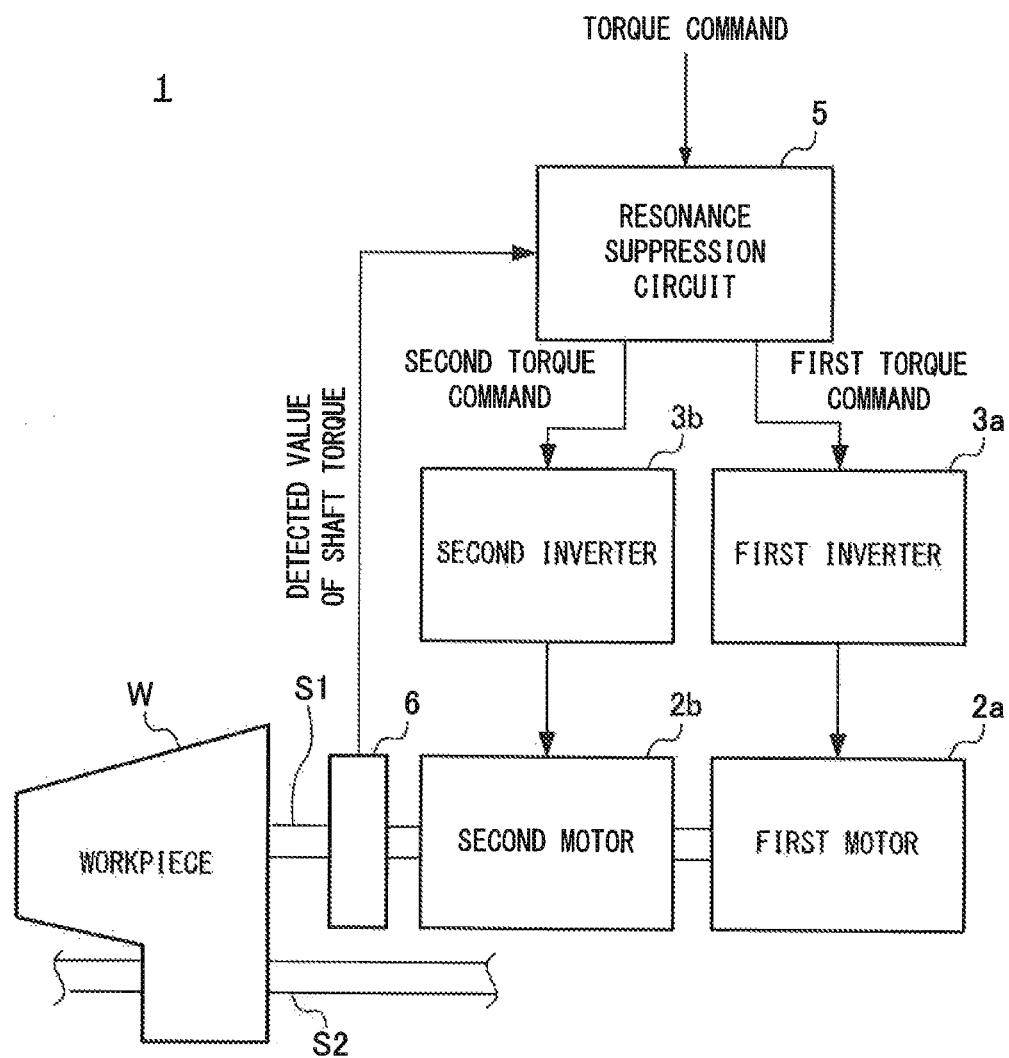
FIG. 1 is a block diagram showing a configuration of a drive-train testing system according to a first embodiment of the present invention.

1 . . . drive-train testing system
2a, 2b . . . first motor, second motor
3a, 3b . . . first inverter, second inverter
5 . . . resonance suppression circuit
6 . . . torque meter
W . . . workpiece
S1 . . . input shaft
S2 . . . drive shaft
7, 7A, 7B, 7C . . . generalized plant
P . . . nominal plant
K, K' . . . controller

PREFERRED MODE FOR CARRYING OUT THE INVENTION

First Embodiment

A drive-train testing system according to a first embodiment of the present invention is hereinafter described in detail with reference to the drawings.

Figure 8:
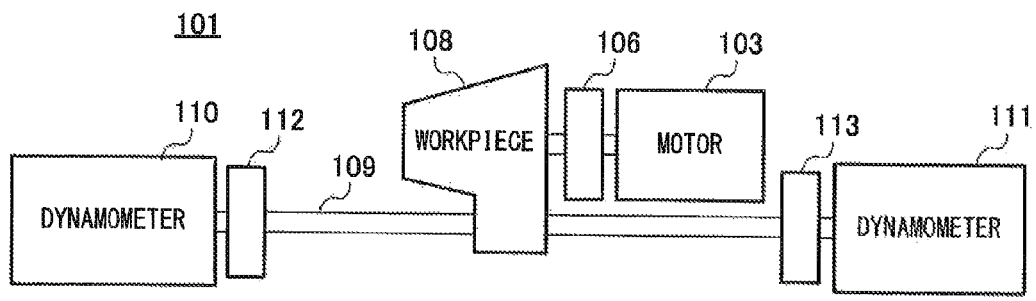
FIG. 8 is a diagram showing a configuration of a conventional drive-train testing system of an FF drive system.
Figure 9:
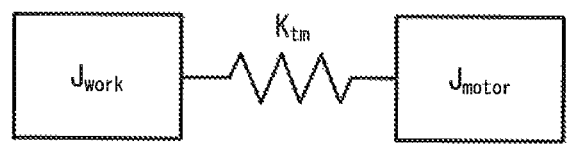
FIG. 9 is a diagram showing a configuration of a mechanical system model of a two-inertia system.

FIG. 1 is a block diagram showing a configuration of a drive-train testing system 1 of the present embodiment. FIG. 1 shows an example, in which the drive train of the FF drive system described above with reference to FIG. 8 is applied to the testing system 1 as a test piece; however, the present invention is not limited thereto.

The testing system 1 is provided with: a first motor 2a and a second motor 2b which are serially connected with each other; a first inverter 3a and a second inverter 3b for supplying electric power to the motors 2a and 2b; a resonance suppression circuit 5 for dividing a single torque command into torque commands for the motors 2a and 2b, respectively; and a torque meter 6.

The first motor 2a and the second motor 2b are coaxially connected with each other through respective drive shafts thereof, and are provided in parallel to the vicinity of a drive shaft S2 that is an output shaft of a workpiece W. The drive shaft of the first motor 2a is coaxially connected to an anti-workpiece side of the drive shaft of the second motor 2b; and a workpiece side of the drive shaft of the second motor 2b is coaxially connected to an input shaft S1 of the workpiece W. In other words, a driving torque, which adds up the torques generated in the two motors 2a and 2b, is input into the input shaft S1 of the workpiece W. Similarly to the conventional testing system described above with reference to FIG. 8, dynamometers (not shown) for generating an absorbing torque for absorbing a transmission output are respectively connected to both ends of the drive shaft S2 of the workpiece W.

The first inverter 3a supplies electric power, which is supplied from a power source (not shown), to the first motor 2a, such that the first motor 2a generates a motor torque in accordance with a first torque command (to be described later) that is input from the resonance suppression circuit 5. The second inverter 3b supplies electric power, which is supplied from a power source (not shown), to the second motor 2b, such that the second motor 2b generates a motor torque in accordance with a second torque command (to be described later) that is input from the resonance suppression circuit 5.

The torque meter 6 detects a torque acting on the input shaft S1 of the workpiece W, i.e. a torque acting on a shaft between the workpiece W and the first motor 2a, based on, for example, a strain amount in a torsion direction of the axis, and transmits a signal, which is substantially proportional to a detected value, to the resonance suppression circuit 5.

The resonance suppression circuit 5 uses the detected value of the torque meter 6 as feedback, and divides the torque command, which is calculated by an arithmetic unit (not shown), into the first torque command and the second torque command, so as to suppress the torsion resonance that may be generated in the shaft connecting the first motor 2a, the second motor 2b and the workpiece W. The torque commands correspond to commands for the driving torques that should be generated in the two motors 2a and 2b configured in tandem, and are configured by superimposing an alternating-current component of a predetermined excitation frequency simulating a torque pulsation of an engine on a direct-current component corresponding to a base torque.

In order to achieve the aforementioned control purposes such as arithmetic calculation of torque division and suppression of torsion resonance, a controller which is designed by using a control system design method referred to as an H ∞ control or µ synthesis is preferably used as the resonance suppression circuit 5, in which the controller is configured by being implemented as an electronic computer. Specific examples thereof are described later in Examples 1 and 2.

In the testing system 1 configured as described above, the driving torque including the fluctuation simulating the torque pulsation of the engine is generated in the motors 2a and 2b configured in tandem; and the driving torque is input into the input shaft S1 of the workpiece W, thereby evaluating durability performance, quality, etc. of the workpiece W.

Example 1

Next, Example 1 of the above embodiment is described. As described in the above embodiment, a controller, which is designed by using the control system design method such as an H ∞ control or µ synthesis, is preferably used as the resonance suppression circuit 5 that is responsible for dividing the torque into the two motors. The design of the controller based on these robust control theories is mainly composed of four steps of: selecting a nominal plant; setting various frequency weighting functions; setting a generalized plant; and calculating a controller based on the generalized plant thus set. Among the four steps, in particular, the steps of setting the weighting functions and the generalized plant are the most important steps for reflecting the control specifications on the controller.

Figure 2:
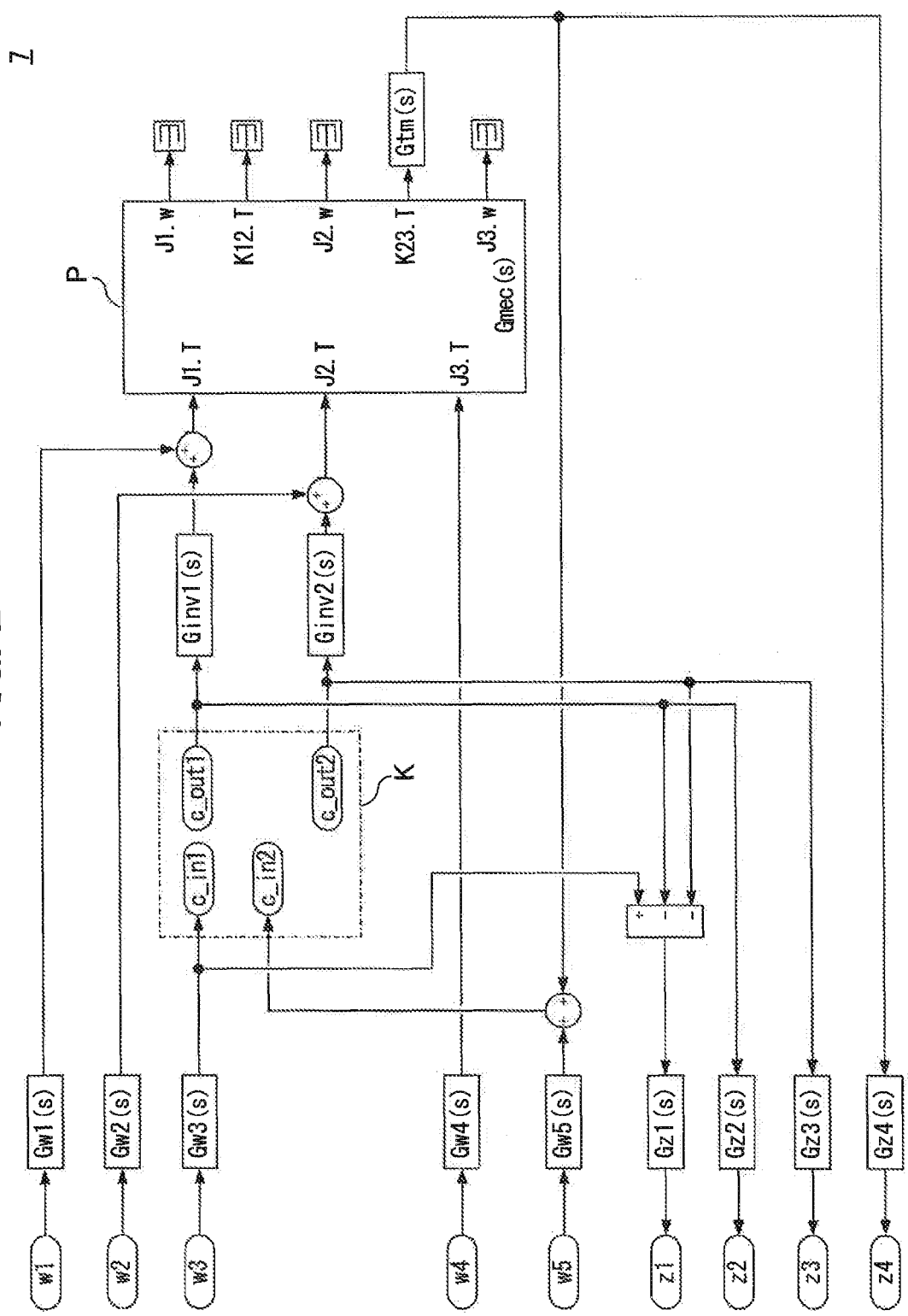
FIG. 2 is a block diagram showing a configuration of a generalized plant of Example 1.

FIG. 2 is a block diagram showing a configuration of a generalized plant 7 of the present Example.

In FIG. 2, five input signals w1, w2, w3, w4 and w5 denote disturbances in the generalized plant 7, respectively; and four output signals z1, z2, z3 and z4 denote controlled variables in the generalized plant 7, respectively. Two output signals c_out1 and c_out2 correspond to control inputs that are input into a nominal plant P from a controller K, respectively; and two input signals c_in1 and c_in2 correspond to observables that are input into the controller K, respectively.

The five disturbances w1, . . . and w5 are assumed be: parameters that are considered to have a large influence in the real system 1 described in the above embodiment; and parameters that are desired to have a target tracking property. More specifically, the disturbances are defined as follows.

w1 is a control error of the motor torque of the first motor by the first inverter. That is to say, w1 is weighted by a weighting function Gw1 (s), is subsequently added up with an output of a transfer function Ginv1 (s) indicating a response characteristic of the first inverter, and is input into the nominal plant P, as a torque J1.T of the first motor.

w2 is a control error of the motor torque of the second motor by the second inverter. That is to say, w2 is weighted by a weighting function Gw2 (s), is subsequently added up with an output of a transfer function Ginv2 (s) indicating a response characteristic of the second inverter, and is input into the nominal plant P, as a torque J2.T of the second motor.

w3 is a torque command. That is to say, w3 is weighted by a weighting function Gw3 (s), and is input into the controller K, as an observable c_in1.

w4 is a torque to be input into the workpiece through the output shaft. That is to say, w4 is weighted by a weighting function Gw4 (s), and is subsequently input into the nominal plant P, as a torque J3.T of the workpiece.

W5 is a detected error of the torque meter. That is to say, w5 is weighted by a weighting function Gw5 (s), is subsequently added up with an output from a transfer function Gtm (s) indicating a response characteristic of the torque meter, and is input into the controller K, as an observable c_in2.

The controller K outputs the control inputs c_out1 and c_out2, based on the observable c_in1 that was input as a torque command, and the observable c_in2 that was input as a detected value of the torque meter.

The control input c_out1 is multiplied by the transfer function Ginv1 (s) having a characteristic of the first inverter as the first torque command, is subsequently added up with the disturbance w1 weighted as described above, and is input into the nominal plant P, as a torque JT.1 of the first motor.

The control input c_out2 is multiplied by the transfer function Ginv2 (s) having a characteristic of the second inverter as the second torque command, is subsequently added up with the disturbance w2 weighted as described above, and is input into the nominal plant P, as a torque JT.2 of the second motor.

When inputting the torque JT.1 of the first motor, the torque JT.2 of the second motor, and the torque JT.3 of the workpiece, the nominal plant P outputs an angular velocity J1.w of the first motor, an angular velocity J2.w of the second motor, an angular velocity J3.w of the workpiece, a torsion torque K12.T of the axis between the first motor and the second motor, and a torsion torque K23.T of the axis between the second motor and the workpiece. In the generalized plant 7 of the present Example, only the torsion torque K23.T of the axis between the second motor and the workpiece is used among the outputs of the nominal plant P; however, the present invention is not limited thereto.

Figure 3:
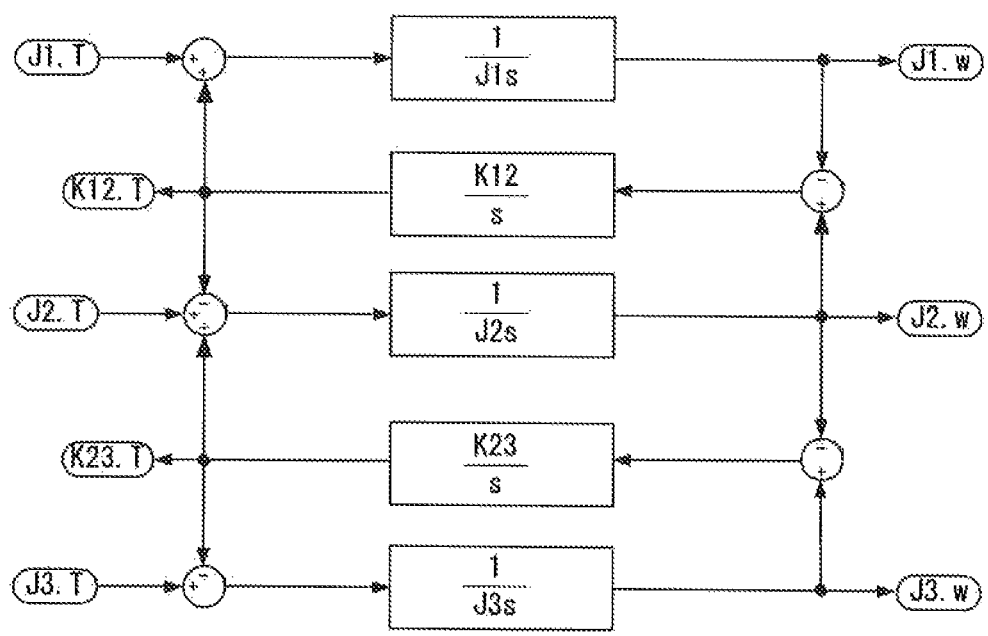
FIG. 3 is a block diagram showing a configuration of a nominal plant of Example 1.

FIG. 3 is a block diagram showing a configuration of the nominal plant P.

As shown in FIG. 3, the nominal plant P is represented by a mechanical system model of a three-inertia system, by combining: a moment of inertia J1 [$kgm^2$] of the first motor; a moment of inertia J2 [$kgm^2$] of the second motor; a moment of inertia J3 [$kgm^2$] of the workpiece; a spring constant K12 [Nm/rad] of a torsional axis connecting the first motor and the second motor; and transfer functions "1/J1·s", "1/J2·s", "1/J3·s", "K12/s" and "K23/s" characterized by a spring constant K23 [Nm/rad] of the torsional axis connecting the second motor and the workpiece.

Referring back to FIG. 2, the four controlled variables z1, . . . and z4 assume the control purpose of appropriately dividing the torque into the first motor and the second motor, so as to suppress the torsion resonance. More specifically, the controlled variables are defined as follows.

z1 is defined as a result of weighting a difference between the weighted torque command and a total of the first torque command and the second torque command. More specifically, the controlled variable z1 is obtained by subtracting the two control inputs c_out1 and c_out2 of the controller K from the observable c_in1 of the controller K, and weighting the subtracted result by a weighting function Gz1 (s).

z2 is defined by the first torque command that is weighted. More specifically, the controlled variable z2 is obtained by weighting the control input c_out1 of the controller K by a weighting function Gz2 (s).

z3 is defined by the second torque command that is weighted. More specifically, the controlled variable z3 is obtained by weighting the control input c_out3 of the controller K by a weighting function Gz3 (s).

z4 is defined by an output of the transfer function Gtm (s) that is weighted. More specifically, the controlled variable z4 is obtained by multiplying the torque K23.T being output from the nominal plant P by the transfer function Gtm (s) indicating a response characteristic of the torque meter, and weighting the multiplied result by a weighting function Gz4 (s).

In the generalized plant 7 as described above, the weighting functions Gw1 (s), . . . and Gw5 (s), as well as Gz1 (s), . . . and Gz4 (s), are determined as follows:

The weighting function Gw1 (s) for the control error w1 of the first inverter is set to, for example, a predetermined constant.

The weighting function Gw2 (s) for the control error w2 of the second inverter is set to, for example, a predetermined constant.

The weighting function Gw3 (s) for the torque command w3 is set to, for example, a predetermined constant.

The weighting function Gw4 (s) for the torque w4 of the workpiece is set to, for example, a predetermined constant.

The weighting function Gw5 (s) for the detected error w5 of the torque meter is set to, for example, a predetermined constant.

The weighting function Gz1 (s) for the difference z1 between the torque command and the total of the divided torques is set to, for example, a predetermined constant, or such that the gain is higher in a lower range.

The weighting function Gz2 (s) for the first torque command z2 is set to, for example, a predetermined constant, or such that the gain is higher in a higher range.

The weighting function Gz3 (s) for the second torque command z3 is set to, for example, a predetermined constant, or such that the gain is higher in a higher range.

The weighting function Gz4 (s) for the detected value z4 of the torque meter is set to, for example, a predetermined constant.

A specific value of each weighting function is adjusted so as to achieve a desired control purpose. Those determined by system identification are used as the transfer function Ginv1 (s) of the first inverter, the transfer function Ginv2 (s) of the second inverter, and the transfer function Gtm (s) of the torque meter.

Based on the generalized plant 7 configured as above, a plurality of parameters for characterizing the state equations of the controller K are calculated by applying conventionally well-known techniques, such as a method based on the Riccati equation, a technique based on LMI (linear matrix inequality), and a technique based on D-K iteration.

Example 2

Next, Example 2 of the above embodiment is described.

Figure 4:
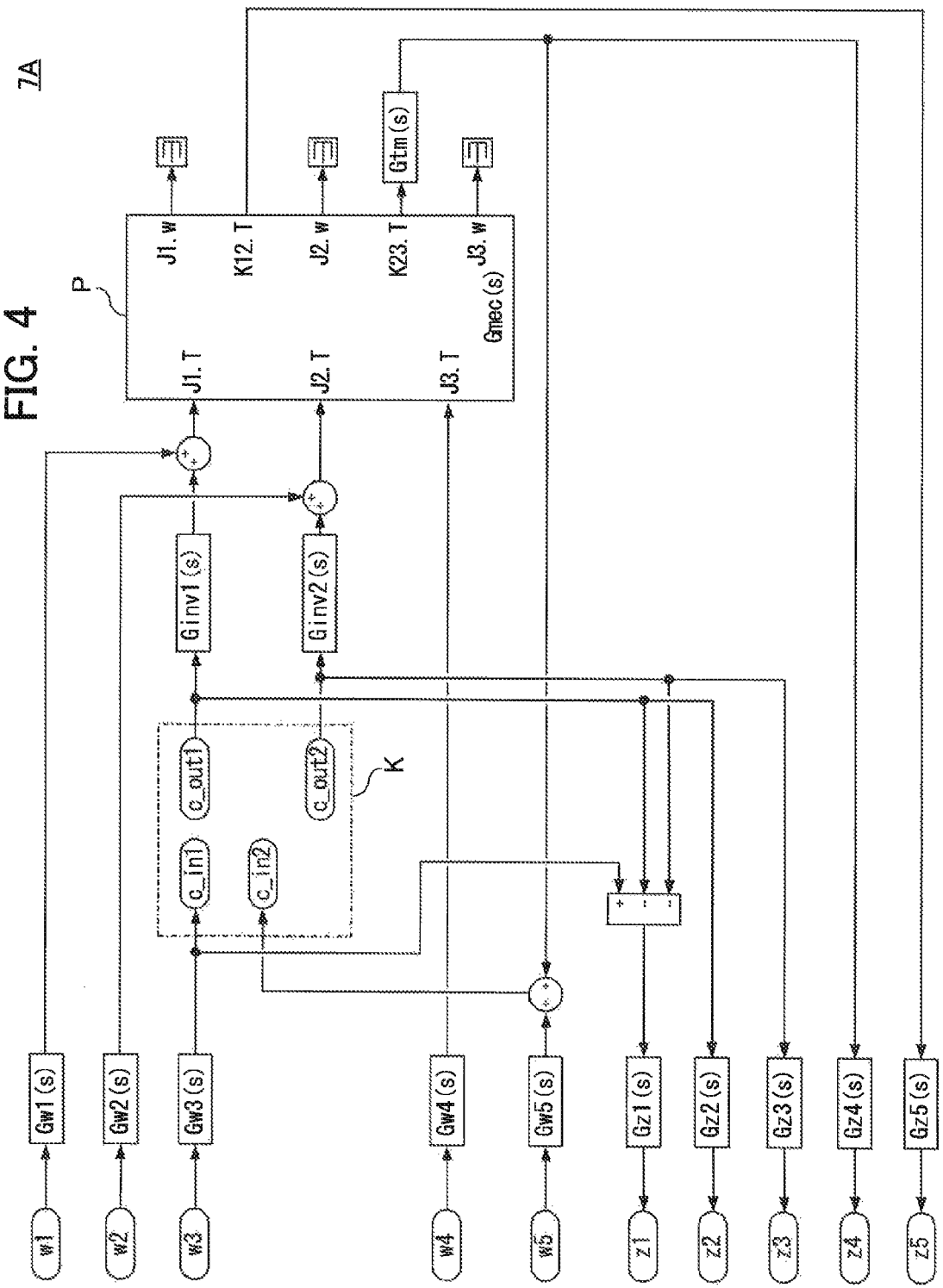
FIG. 4 is a block diagram showing a configuration of a generalized plant of Example 2.

FIG. 4 is a block diagram showing a configuration of a generalized plant 7A of the present Example. The generalized plant of the present Example further includes a controlled variable z5 that is obtained by weighting a value K12.T of a shaft torque between the second motor and the first motor, which is output from the nominal plant P, by a transfer function Gz5 (s), which is a point of difference from the generalized plant 7 of Example 1.

Next, effects of a resonance suppression circuit, which is designed based on the generalized plant of the present Example, are described.

Figure 5:
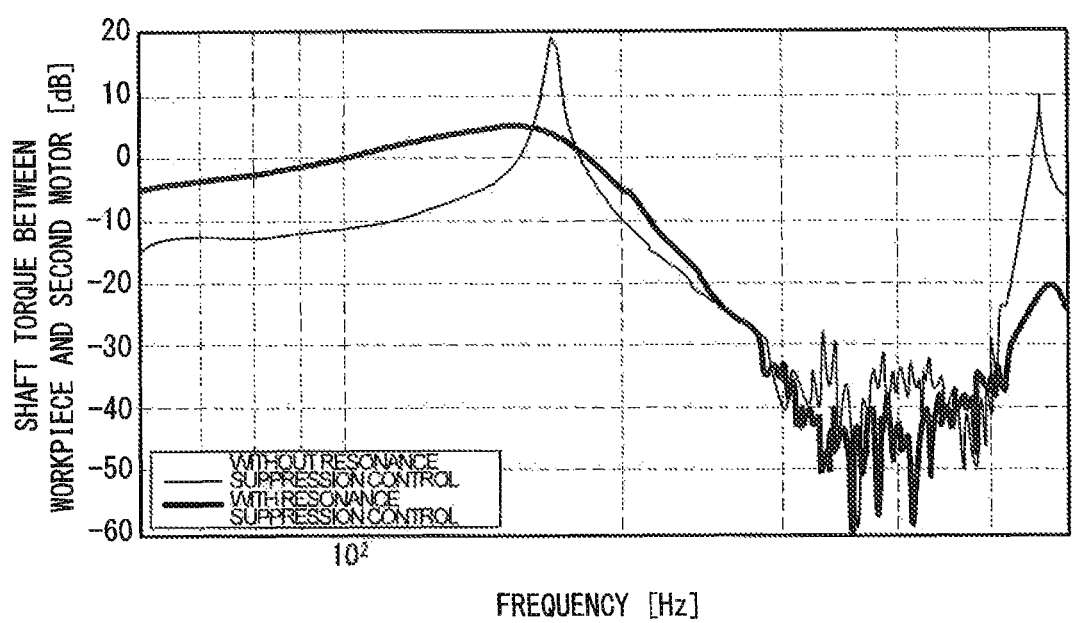
FIG. 5 is a Bode diagram showing frequency responses, from a torque command to a shaft torque between a workpiece and a second motor (Example 2)

FIG. 5 is a Bode diagram showing frequency responses, from the torque command to the shaft torque between the workpiece and the second motor.

Figure 6:
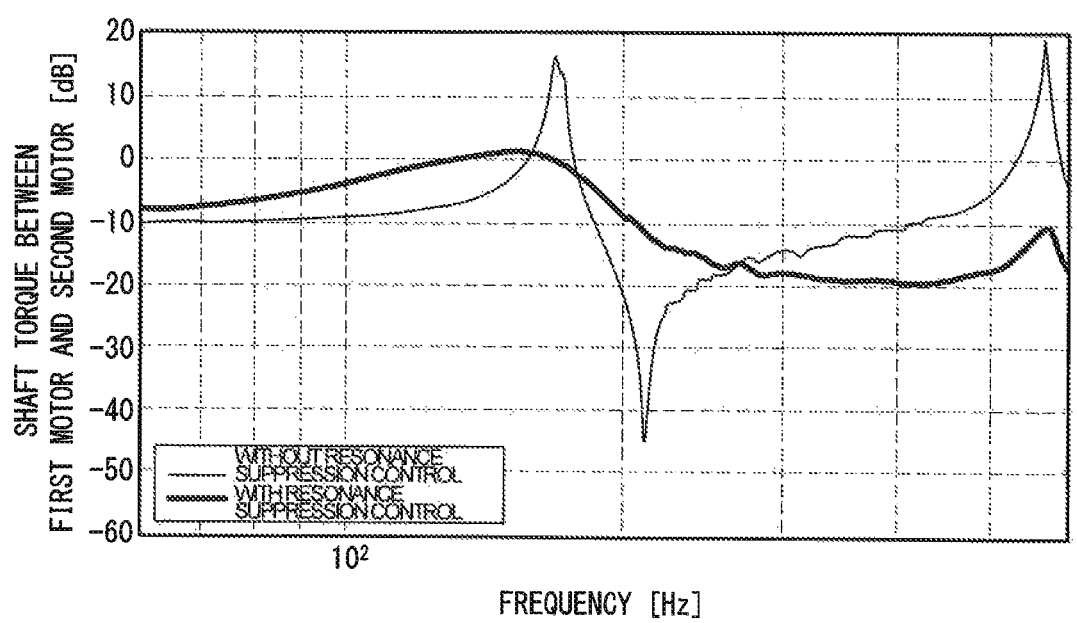
FIG. 6 is a Bode diagram showing frequency responses, from a torque command to a shaft torque between a first motor and the second motor (Example 2)
Figure 7:
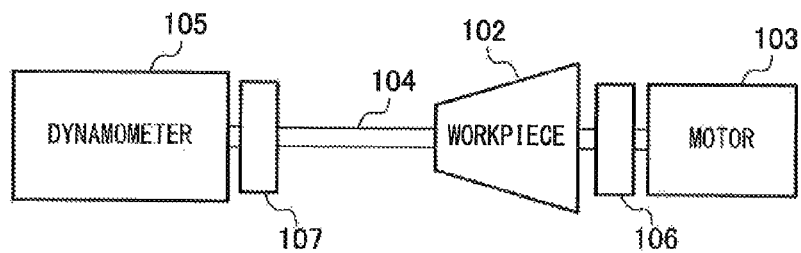
FIG. 7 is a diagram showing a configuration of a conventional drive-train testing system of an FR drive system.

FIG. 6 is a Bode diagram showing frequency responses, from the torque command to the shaft torque between the first motor and the second motor. In FIGS. 5 and 6, the thick line shows an example of the testing system with resonance suppression control; more specifically, an example of the testing system, in which the controller designed based on the generalized plant of the present Example is applied to the resonance suppression circuit. The thin line shows an example of the testing system without resonance suppression control; more specifically, an example of the testing system, in which the torque is divided into the first motor and the second motor at a certain ratio.

As shown in FIG. 5, it was verified that torsion resonance was generated in a range between 150 and 200 [Hz] in the shaft torque between the workpiece and the second motor in the system without resonance suppression control; whereas such resonance was suppressed according to the system of the present invention. As shown in FIG. 6, it was verified that resonance and antiresonance were generated in a range between 150 and 250 [Hz] in the system without resonance suppression control; whereas such resonance and antiresonance were both suppressed according to the system of the present invention.

According to the present Example, the generalized plant 7A is configured such that, in addition to the shaft torque between the workpiece and the second motor, the shaft torque between the second motor and the first motor can be explicitly evaluated as controlled variables, thereby making it possible to design a resonance suppression circuit, in which a resonance characteristic between the second motor and the first motor is additionally considered, as compared with Example 1.

FIGS. 5 and 6 show the resonance suppression effects according to Example 2, but do not show that Example 1 does not have resonance suppression effects. Example 1 also achieves resonance suppression effects of the same quality as shown in FIGS. 5 and 6. In particular, torsional vibration is transmitted in a longitudinal direction of a shaft; therefore, even if the shaft torque between the second motor and the first motor is not evaluated as the controlled variable as in the case of the generalized plant of Example 2, namely in Example 1 as well, the effects of suppressing the torsional vibration between the second motor and the first motor as shown in FIG. 6 are achieved.

Second Embodiment

A drive-train testing system according to a second embodiment of the present invention is hereinafter described in detail with reference to the drawings. In following descriptions, detailed descriptions are omitted for configurations that are the same as those in the first embodiment.

A configuration of a resonance suppression circuit of a testing system of the present embodiment differs from the configuration of the resonance suppression circuit 5 of the first embodiment described above (see FIG. 1). More specifically, a torque command is defined as a shaft torque command for the shaft torque between the workpiece W and the second motor 2b. In addition to the resonance suppression function described above, the resonance suppression circuit of the present embodiment further includes a shaft torque control function of determining a first torque command and a second torque command, such that a detected value of the torque meter 6 serves as the shaft torque command. Specific examples of the controller further including such a shaft torque control function are hereinafter described as Examples 3 and 4.

Example 3

Figure 10:
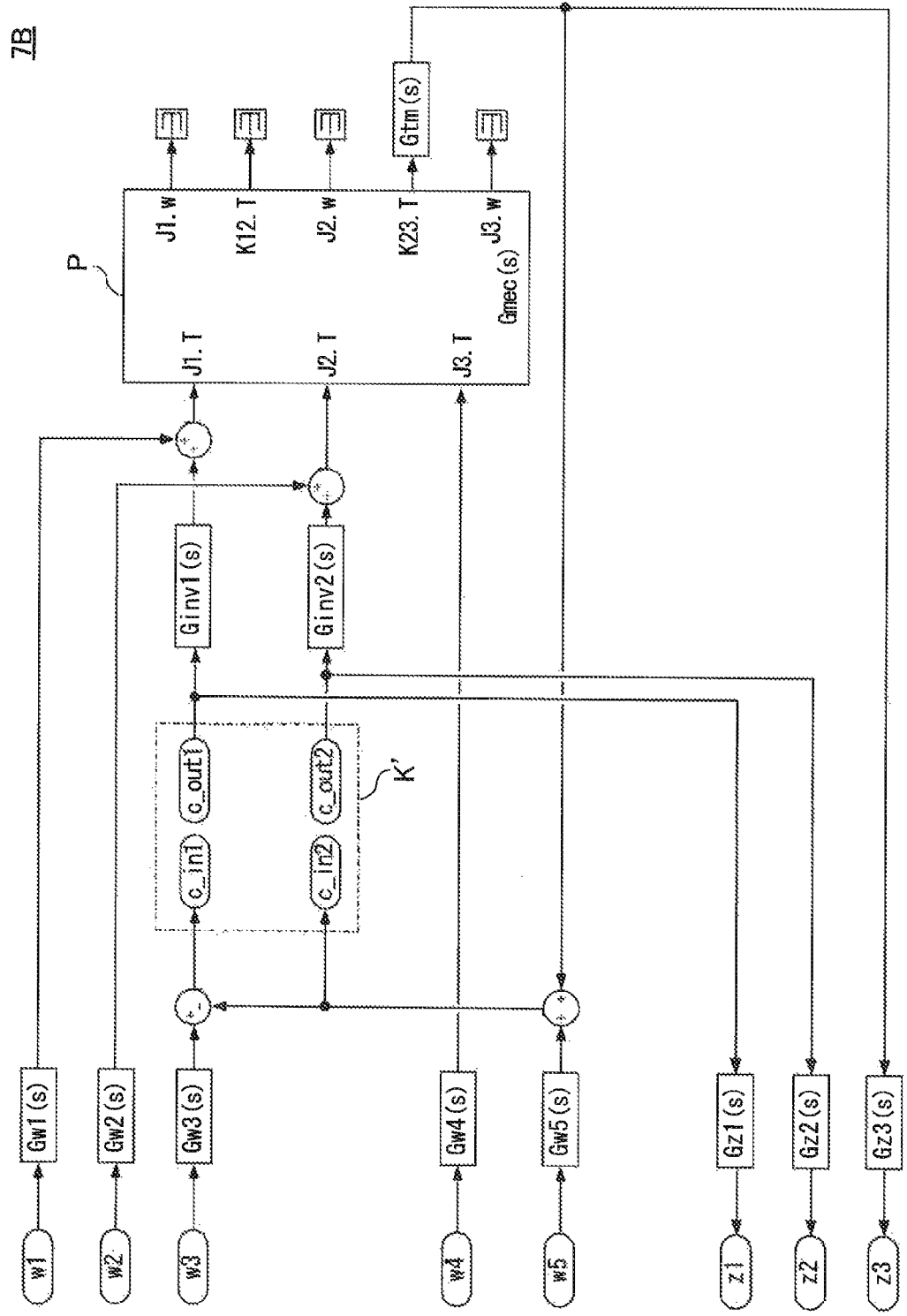
FIG. 10 is a block diagram showing a configuration of a generalized plant of Example 3.

FIG. 10 is a block diagram showing a configuration of a generalized plant 7B of the present Example.

In FIG. 10, five input signals w1, w2, w3, w4 and w5 denote disturbances in the generalized plant 7B, respectively; and three output signals z1, z2 and z3 denote controlled variables in the generalized plant 7, respectively. Two output signals c_out1 and c_out2 correspond to control inputs that are input into a nominal plant P from a controller K, respectively; and two input signals c_in1 and c_in2 correspond to observables that are input into the controller K', respectively.

w1 is a control error of the motor torque of the first motor by the first inverter. That is to say, w1 is weighted by a weighting function Gw1 (s), is subsequently added up with an output of a transfer function Ginv1 (s) indicating a response characteristic of the first inverter, and is input into the nominal plant P, as a torque J1.T of the first motor.

w2 is a control error of the motor torque of the second motor by the second inverter. That is to say, w2 is weighted by a weighting function Gw2 (s), is subsequently added up with an output of a transfer function Ginv2 (s) indicating a response characteristic of the second inverter, and is input into the nominal plant P, as a torque J2.T of the second motor.

w3 is a shaft torque command. w3 is weighted by a weighting function Gw3 (s).

w4 is a generated torque of the workpiece. That is to say, w4 is weighted by a weighting function Gw4 (s), and is subsequently input into the nominal plant P, as a torque J3.T of the workpiece. W5 is a detected error of the torque meter.

w5 is weighted by a weighting function Gw5 (s).

The controller K' outputs control inputs c_out1 and c_out2, based on the observable c_in1 and c_in2.

The observable c_in2 is obtained by adding the detected error w5 of the torque meter weighted by Gw5 (s) to the output of the torque meter including the detected error, more specifically, to the output from the transfer function Gtm (s) indicating a response characteristic of the torque meter.

In order to provide the shaft torque control function to the controller K', the observable c_in1 is a deviation between the shaft torque command weighted by Gw3 (s), and the observable c_in2.

The control input c_out1 is multiplied by the transfer function Ginv1 (s) having a characteristic of the first inverter as the first torque command, is subsequently added up with the disturbance w1 weighted as described above, and is input into the nominal plant P, as a torque JT.1 of the first motor.

The control input c_out2 is multiplied by the transfer function Ginv2 (s) having a characteristic of the second inverter as the second torque command, is subsequently added up with the disturbance w2 weighted as described above, and is input into the nominal plant P, as a torque JT.2 of the second motor.

The three controlled variables z1, . . . and z3 assume the control purpose of appropriately dividing the torque into the first motor and the second motor, so as to suppress the torsion resonance. More specifically, the controlled variables are defined as follows.

z1 is defined by the first torque command that is weighted. More specifically, the controlled variable z1 is obtained by weighting the control input c_out1 of the controller K by a weighting function Gz1 (s).

z2 is defined by the second torque command that is weighted. More specifically, the controlled variable z2 is obtained by weighting the control input c_out2 of the controller K by a weighting function Gz2 (s).

z3 is defined by an output of the transfer function Gtm (s) that is weighted. More specifically, the controlled variable z3 is obtained by multiplying the torque K23.T being output from the nominal plant P by the transfer function Gtm (s) indicating a response characteristic of the torque meter, and weighting the multiplied result by a weighting function Gz3 (s).

In the generalized plant 7B as described above, the weighting functions Gw1 (s), . . . and Gw5 (s), as well as Gz1 (s), . . . and Gz3 (s), are determined as follows.

The weighting function Gw1 (s) for the control error w1 of the first inverter is set to, for example, a predetermined constant.

The weighting function Gw2 (s) for the control error w2 of the second inverter is set to, for example, a predetermined constant.

The weighting function Gw3 (s) for the shaft torque command w3 is set to, for example, a predetermined constant.

The weighting function Gw4 (s) for the shaft torque w4 is set to, for example, a predetermined constant.

The weighting function Gw5 (s) for the detected error w5 of the torque meter is set to, for example, a predetermined constant.

The weighting function Gz1 (s) for the first torque command z1 is set to, for example, a predetermined constant, or such that the gain is higher in a higher range.

The weighting function Gz2 (s) for the second torque command z2 is set to, for example, a predetermined constant, or such that the gain is higher in a higher range.

The weighting function Gz3 (s) for the detected value z3 of the torque meter is set to, for example, a predetermined constant.

Example 4

Next, Example 4 of the above embodiment is described.

Figure 11:
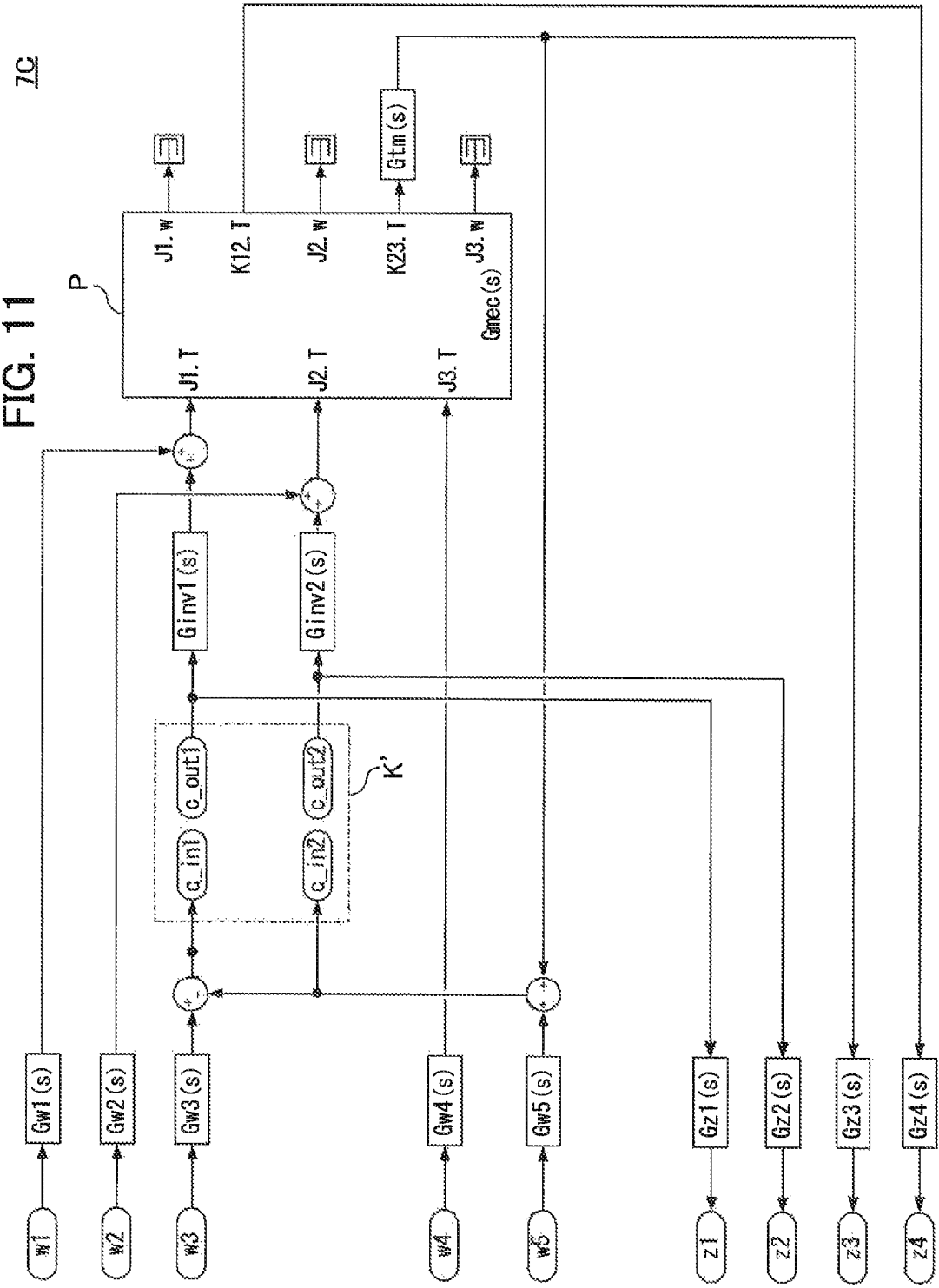
FIG. 11 is a block diagram showing a configuration of a generalized plant of Example 4.

FIG. 11 is a block diagram showing a configuration of a generalized plant 7C of the present Example. The generalized plant of the present Example further includes a controlled variable z4 that is obtained by weighting a value K12.T of a shaft torque between the second motor and the first motor, which is output from the nominal plant P, by a transfer function Gz4 (s), which is a point of difference from the generalized plant 7B of Example 3.

Next, effects of a resonance suppression circuit designed based on the generalized plant of the present Example are described.

Figure 12:
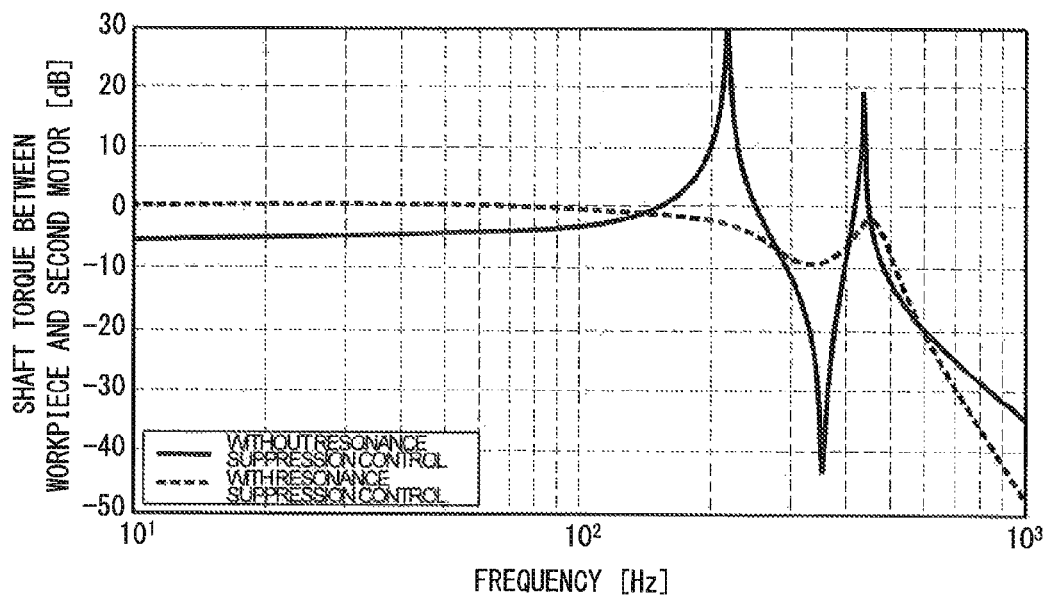
FIG. 12 is a Bode diagram showing frequency responses, from a shaft torque command to a shaft torque between the workpiece and the second motor (Example 2)
Figure 13:
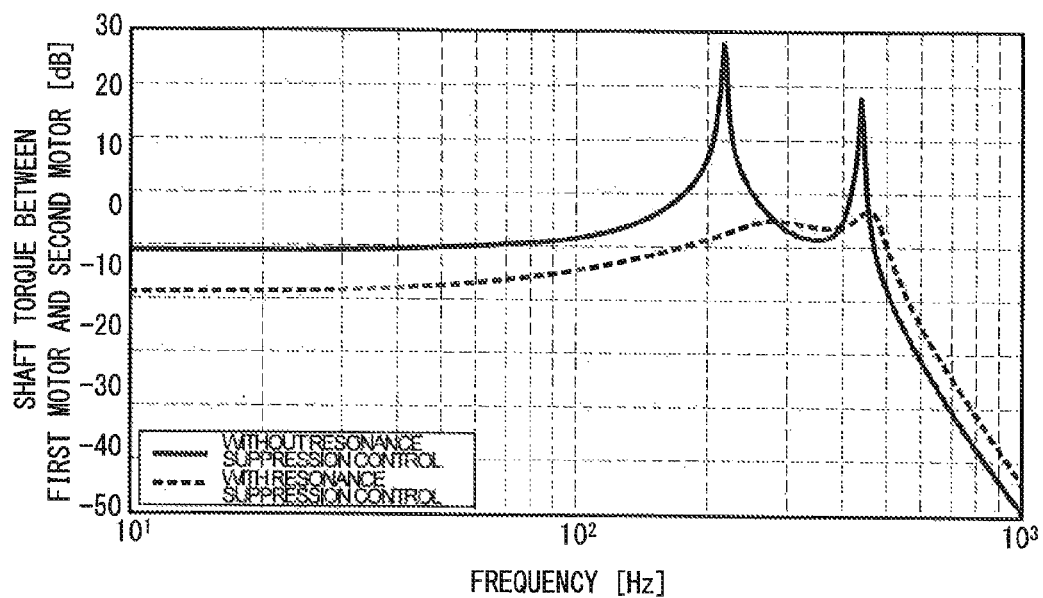
FIG. 13 is a Bode diagram showing frequency responses, from a shaft torque command to a shaft torque between the first motor and the second motor (Example 2).

FIG. 12 is a Bode diagram showing frequency responses, from the shaft torque command to the shaft torque between the workpiece and the second motor. FIG. 13 is a Bode diagram showing frequency responses, from the shaft torque command to the shaft torque between the first motor and the second motor. As shown in FIGS. 12 and 13, it was verified that the resonance, which was present in the vicinity of approximately 200 [Hz], was suppressed according to the system of the present invention.

According to the present Example, the generalized plant 7C is configured such that, in addition to the shaft torque between the workpiece and the second motor, the shaft torque between the second motor and the first motor can be explicitly evaluated as controlled variables, thereby making it possible to design a resonance suppression circuit, in which a resonance characteristic between the second motor and the first motor is additionally considered, as compared with Example 3. FIGS. 12 and 13 show the resonance suppression effects according to Example 4, but do not show that Example 3 does not have resonance suppression effects. Example 3 also achieves resonance suppression effects of the same quality as shown in FIGS. 12 and 13, for similar reasons as described in Example 2.

The invention claimed is:

1. A drive-train testing system for evaluating a characteristic of a workpiece by inputting a driving torque, which is generated in accordance with a torque command including an alternating-current component of an excitation frequency, into an input shaft of the workpiece configuring a part of a drive train, the drive-train testing system comprising:
   a first motor;
   a second motor, one end side of a drive shaft thereof being connected to a drive shaft of the first motor, and the other end side of the drive shaft thereof being connected to an input shaft of the workpiece;
   a shaft torque meter for detecting a torque that acts on a shaft between the workpiece and the second motor; and
   a resonance suppression circuit for dividing the torque command into a first torque command for the first motor and a second torque command for the second motor, based on a detected value of the shaft torque meter, so as to suppress torsion resonance of an axis that connects the first motor, the second motor, and the workpiece.

2. The drive-train testing system according to claim 1, wherein a generalized plant is defined, in which a nominal plant is a mechanical system model of a three-inertia system having transfer functions characterized by: a moment of inertia of the first motor; a moment of inertia of the second motor; a moment of inertia of the workpiece; a spring constant of a torsional axis connecting the first motor and the second motor; and a spring constant of a torsional axis connecting the second motor and the workpiece, and
wherein the resonance suppression circuit is designed by applying a control system design method, which is referred to as an H ∞ control or µ synthesis, to the generalized plant.

3. The drive-train testing system according to claim 2, further comprising:
   a first inverter for supplying electric power to the first motor, in accordance with the first torque command calculated by the resonance suppression circuit; and
   a second inverter for supplying electric power to the second motor, in accordance with the second torque command calculated by the resonance suppression circuit,
   wherein the generalized plant includes a control error of the first inverter, a control error of the second inverter, and a detected error of the shaft torque meter, as disturbances, and
   wherein the generalized plant includes a result of weighting a difference between a weighted torque command and a total of the first torque command and the second torque command, and a result of weighting an output of the transfer functions having a characteristic, of the shaft torque meter, as controlled variables.

4. The drive-train testing system according to claim 3, wherein the generalized plant includes a result of weighting a shaft torque between the first motor and the second motor, which is output from the nominal plant, as a controlled variable.

5. The drive-train testing system according to claim 2, wherein the torque command is defined as a shaft torque command for a shaft torque between the workpiece and the second motor, and
wherein the resonance suppression circuit determines the first and second torque commands, such that a detected value of the shaft torque meter serves as the shaft torque command.

6. The drive-train testing system according to claim 5, wherein a generalized plant is defined, in which a nominal plant is a mechanical system model of a three-inertia system having transfer functions characterized by: a moment of inertia of the first motor; a moment of inertia of the second motor; a moment of inertia of the workpiece; a spring constant of a torsional axis connecting the first motor and the second motor; and a spring constant of a torsional axis connecting the second motor and the workpiece, and wherein the resonance suppression circuit is designed by applying a control system design method, which is referred to as an H ∞ control or µ synthesis, to the generalized plant.

7. The drive-train testing system according to claim 6, further comprising:
   a first inverter for supplying electric power to the first motor, in accordance with the first torque command calculated by the resonance suppression circuit; and
   a second inverter for supplying electric power to the second motor, in accordance with the second torque command calculated by the resonance suppression circuit,
   wherein the generalized plant includes a control error of the first inverter, a control error of the second inverter, the shaft torque command, and a detected error of the shaft torque meter, as disturbances, and
   wherein the generalized plant includes a deviation between a weighted shaft torque command and a result of weighting an output of the transfer functions having a characteristic of the shaft torque meter, as an observable to be input into a controller.

8. The drive-train testing system according to claim 7, wherein the generalized plant includes a result of weighting a shaft torque between the first motor and the second motor, which is output from the nominal plant, as a controlled variable.

* * * * *